(12) United States Patent
Knappmann

(10) Patent No.: US 7,876,650 B2
(45) Date of Patent: Jan. 25, 2011

(54) APPARATUS COMPRISING A PICKUP PROVIDING THREE BEAMS FOR READING DATA FROM OR WRITING DATA TO AN OPTICAL STORAGE MEDIUM, AND RESPECTIVE OPTICAL STORAGE MEDIUM

(75) Inventor: Stephan Knappmann, Rottweil (DE)

(73) Assignee: Thomson Licensing, Boulogne-Billancourt (FR)

( * ) Notice: Subject to any disclaimer, the term of this patent is extended or adjusted under 35 U.S.C. 154(b) by 310 days.

(21) Appl. No.: 12/214,344

(22) Filed: Jun. 18, 2008

(65) Prior Publication Data
US 2009/0003147 A1    Jan. 1, 2009

(30) Foreign Application Priority Data
Jun. 29, 2007   (EP)  ................................. 07111477

(51) Int. Cl.
*G11B 7/00*   (2006.01)
(52) U.S. Cl. .................... 369/44.37; 369/285
(58) Field of Classification Search ........................ None
See application file for complete search history.

(56) References Cited

U.S. PATENT DOCUMENTS

| | | | |
|---|---|---|---|
| 5,541,909 A | 7/1996 | Nakajima et al. | |
| 5,625,618 A * | 4/1997 | Oki | ......................... 369/275.1 |
| 5,701,286 A | 12/1997 | Sato | |
| 6,041,031 A | 3/2000 | Ichimura et al. | |
| 6,185,178 B1 | 2/2001 | Noh | |
| 6,324,139 B1 | 11/2001 | Nakane | |

(Continued)

FOREIGN PATENT DOCUMENTS

EP    0 525 191 A    2/1993

(Continued)

OTHER PUBLICATIONS

Search Reprot Nov. 28, 2007.

(Continued)

*Primary Examiner*—Joseph Haley
(74) *Attorney, Agent, or Firm*—Robert D. Shedd; Joseph J. Opalach; Jerome G. Schaefer

(57) ABSTRACT

The apparatus comprises a pickup with a laser, a detector unit and an objective lens for reading data from or writing data to a Super-RENS optical storage medium having a track pitch below the optical resolution limit, the pickup generating a main beam for reading and/or writing of data and generating two satellite beams for providing a tracking error signal, the three beams being focused by the objective lens onto the optical storage medium, and the reflected light from the optical storage medium being guided onto the detector unit. The main beam and the two satellite beams have a light intensity on the optical storage medium being sufficient for providing a super-resolution effect for the main beam as well as for each satellite beam. The light intensity of the two satellite beams is each in the order of 50 to 100% of the intensity of the main beam, if the apparatus is used for reading of data. The detector unit comprises in particular a main detector for detecting reflected light from the main beam, and two satellite detectors for detecting reflected light from the satellite beams reflected from the optical storage medium, and wherein the detector unit provides 3-beam tracking error signal for a tracking regulation.

12 Claims, 2 Drawing Sheets

U.S. PATENT DOCUMENTS

| | | |
|---|---|---|
| 2002/0018411 A1 | 2/2002 | Kumagai |
| 2002/0064601 A1 | 5/2002 | Ott |
| 2003/0039200 A1 | 2/2003 | Shintani et al. |
| 2003/0053395 A1* | 3/2003 | Kadowaki et al. ...... 369/112.12 |
| 2003/0179673 A1 | 9/2003 | Shimada et al. |
| 2006/0040088 A1 | 2/2006 | Hirotsune et al. |
| 2006/0262706 A1 | 11/2006 | Wu et al. |
| 2006/0285471 A1* | 12/2006 | Knittel et al. .......... 369/112.03 |

FOREIGN PATENT DOCUMENTS

| | | |
|---|---|---|
| EP | 0 525 896 A | 2/1993 |
| JP | 06 119653 | 4/1994 |
| WO | WO 95/22822 A | 8/1995 |
| WO | WO 03/034412 | 4/2003 |
| WO | WO 2005/064601 A | 7/2005 |

OTHER PUBLICATIONS

European Search Report dated Aug. 7, 2008.

* cited by examiner

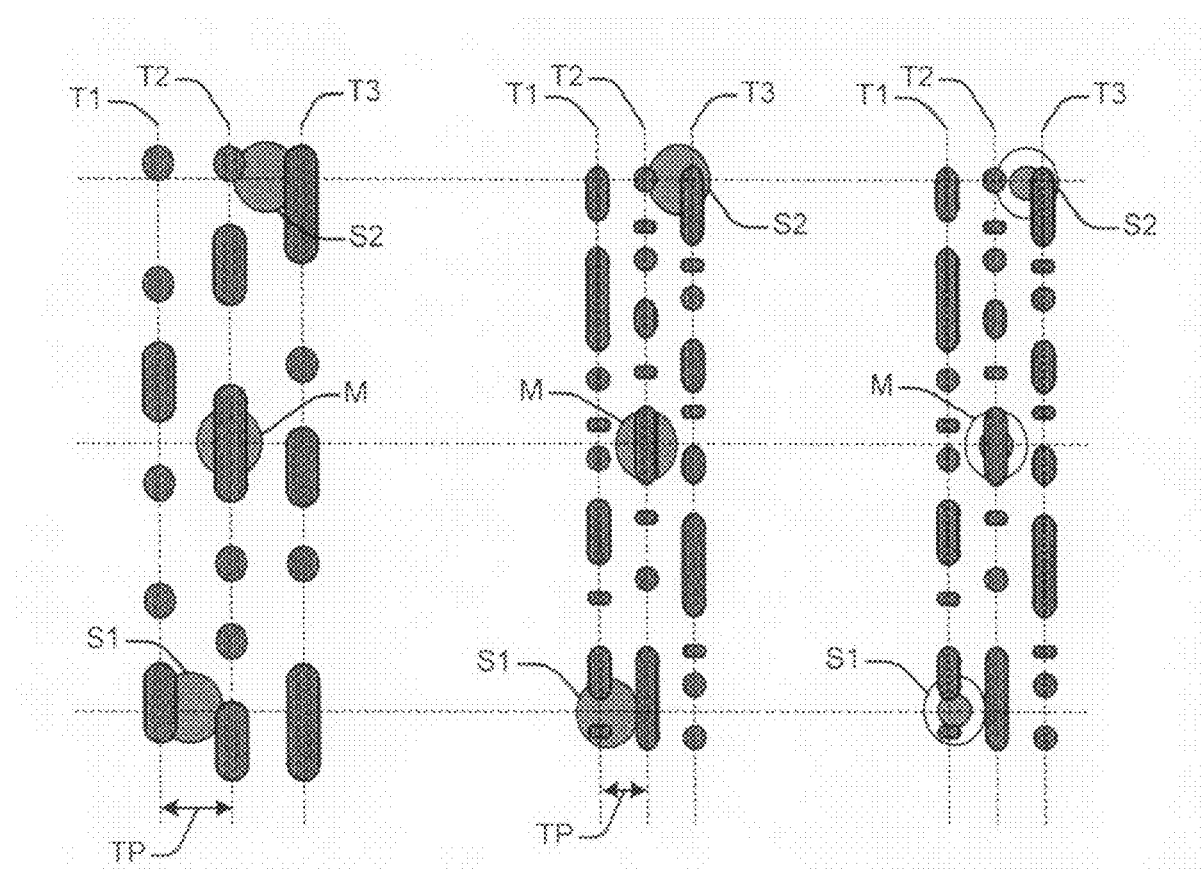
Fig. 3a  Fig. 3b  Fig. 3c
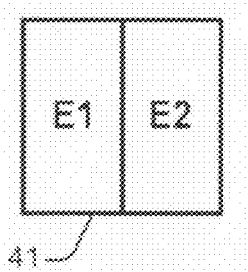 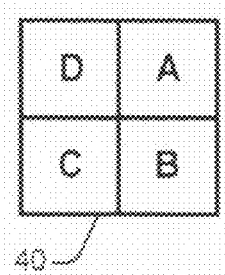 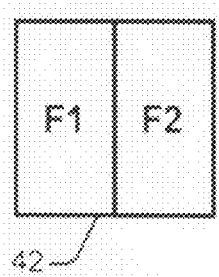
Fig. 4

APPARATUS COMPRISING A PICKUP PROVIDING THREE BEAMS FOR READING DATA FROM OR WRITING DATA TO AN OPTICAL STORAGE MEDIUM, AND RESPECTIVE OPTICAL STORAGE MEDIUM

This application claims the benefit, under 35 U.S.C. §119, of European Patent Application No. 07111477.1 filed Jun. 29, 2007.

FIELD OF THE INVENTION

The present invention relates to an apparatus comprising a pickup with a laser and an objective lens for focusing a main beam and two satellite beams onto an optical storage medium, in particular onto an optical disc, and to an optical storage medium for operation with the apparatus.

BACKGROUND OF THE INVENTION

Optical storage media are media in which data are stored in an optically readable manner, for example by means of a pickup comprising a laser for illuminating the optical storage medium and a photo-detector for detecting the reflected light of the laser beam when reading the data. In the meanwhile a large variety of optical storage media are available, which are operated with different laser wavelength, and which have different sizes for providing storage capacities from below one Gigabyte up to 50 Gigabyte (GB). The formats include read-only formats such as Audio CD and Video DVD, write-once optical media as well as rewritable formats like CD-RW, DVD-RW, DVD+RW and DVD-RAM for example. Digital data are stored in these media along tracks in one or more layers of the media.

The storage medium with the highest data capacity is at present the Blu-Ray disc (BD), which allows to store 50 GB on a dual layer disc. Available formats are at present for example read-only BD-ROM, re-writable BD-RE and write once BD-R discs. For reading and writing of a Blu-Ray disc an optical pickup with a laser wavelength of 405 nm is used. On the Blu-Ray disc a track pitch of 320 nm and a mark length from 2T to 8T, maximum 9T is used, where T is the channel bit length, which corresponds with a minimum mark length of 138-160 nm. Further information about the Blu-Ray disc system is available for example from the Blu-Ray group via Internet: www.blu-raydisc.com.

New optical storage media with a super-resolution near-field structure (Super-RENS) offer the possibility to increase the data density of the optical storage medium by a factor of two to four in one dimension in comparison with the Blu-Ray disc. This is possible by using a so-called Super-RENS structure or layer, which is placed above a data layer of the optical storage medium, and which significantly reduces the effective size of a light spot used for reading from or writing to the optical storage medium. The super-resolution layer is also called a mask layer because it is arranged above the data layer and by using specific materials only the high intensity center part of a laser beam can penetrate the mask layer.

The Super-RENS effect allows to record and read data stored in marks of an optical disc, which have a size below the resolution limit of a laser beam used for reading or writing the data on the disc. As known, the diffraction limit of the resolution of the laser beam is about lambda/(2*NA) according to Abbe, where lambda is the wavelength and NA the numerical aperture of the objective lens of the optical pickup.

A Super-RENS optical disc comprising a super-resolution near-field structure formed of a metal oxide or a polymer compound and a phase change layer formed of a GeSbTe or a AgInSbTe based structure for recording of data and reproducing of data is known from WO 2005/081242 and US 2004/0257968. Further examples of super-resolution optical media are described in WO 2004/032123 and by Tominaga et al., Appl. Phys. Lett. Vol. 73, No. 15, 12 Oct. 1998.

The super RENS effect allows to increase the resolution of the optical pickup for reading of the marks on an optical disc, but does not allow to reduce the track pitch.

A pickup providing three light beams with a main beam and two satellite beams for providing a tracking signal for reading data from an optical storage medium is known since the introduction of the CD. In these arrangements, the light intensity of the satellite beams is much smaller than the intensity of the main beam. An apparatus of this kind is described for example in U.S. Pat. No. 6,137,758, which uses a detector unit with a main detector for providing a data signal and a pair of satellite detectors for detecting the satellite beams reflected from the optical storage medium for providing a tracking error signal. The two satellite beam detectors allow to distinguish between a CD and a DVD in addition to the generation of a tracking signal.

Another apparatus comprising a pickup providing a main beam and two satellite beams and having a respective detector unit with a main detector and a pair of satellite beam detectors is described in U.S. Pat. No. 6,510,112 B1. The signals from the two satellite beam detectors are utilized for detecting damaged parts on a storage medium and for providing a compensation signal.

SUMMARY OF THE INVENTION

The apparatus for reading data from and/or writing data to a Super-RENS optical storage medium comprises a pickup with a laser, a detector unit and an objective lens, the pickup generating a main beam for reading and/or writing of data and generating two satellite beams for providing a tracking error signal. The three beams are focused by the objective lens onto the optical storage medium, and the reflected light from the optical storage medium is guided onto the detector unit within the pickup. The light intensity of the main beam and the two satellite beams arriving on the optical storage medium is such, that a super-resolution effect takes place for the main beam as well as for each satellite beam. The light intensity of the two satellite beams is each in the order of 50% to 100% of the intensity of the main beam or reading of data, in particular within 70% to 100% of the intensity of the main beam.

In case the apparatus is used to track on a recordable or rewritable disc having a Super-RENS layer structure and track pitch below the diffraction limit for a recoding of data, it is required to reduce the intensity of the satellite beams, for example by a switchable device, e.g. a liquid crystal element, to an intensity smaller than 50% in order to avoid recording on the neighboring tracks. Nevertheless the intensity of the satellite beams must be high enough to enable the super-resolution effect.

The detector unit of the pickup comprises in particular a main detector for detecting reflected light from the optical storage medium related to the main beam, and a pair of satellite detectors for detecting reflected light from the two satellite beams, as reflected from the optical storage medium, the satellite detectors being each divided into two parts for providing a differential push-pull tracking error signal.

The apparatus is in a further aspect of the invention arranged such, that a differential push-pull tracking error signal is used for an optical storage medium comprising tracks in a first region with a track pitch larger than an optical resolution limit, and a 3-beam tracking error signal is used for a second region of the optical storage medium comprising tracks with a track pitch smaller than an optical resolution limit.

The ratio of the track pitches of region 1 and region 2 is advantageously in the range of about 1.4 to 1.6, the track pitch for the region 1 for example being in a range of 300-330 nm and for region 2 in a range of 150-240 nm. Both regions are in particular arranged such, that a pickup with a blue laser diode can be utilized for reading of data, using for the region 1 a low beam intensity without providing a super-resolution effect and using for region 2 a respectively higher beam intensity for providing a super-resolution effect on the optical storage medium with the main beam and with each the two satellite beams. The track pitch of the region 1 is in particular such, that the two satellite beams have a track offset of approximately ½ track pitch with regard to the main beam for providing optimum use of the differential push pull tracking method within the region 1, and have a track offset of approximately ¾ of the track pitch of region 2 for providing optimum use of the three beam tracking method.

The apparatus and the optical storage medium establish therefore a system for use particularly for high data storage applications when using a pickup with a blue laser diode.

BRIEF DESCRIPTION OF THE DRAWINGS

Preferred embodiments of the invention are explained in more detail below by way of example with reference to schematic drawings, which show.

PREFERRED EMBODIMENTS OF THE INVENTION

Figure 1:
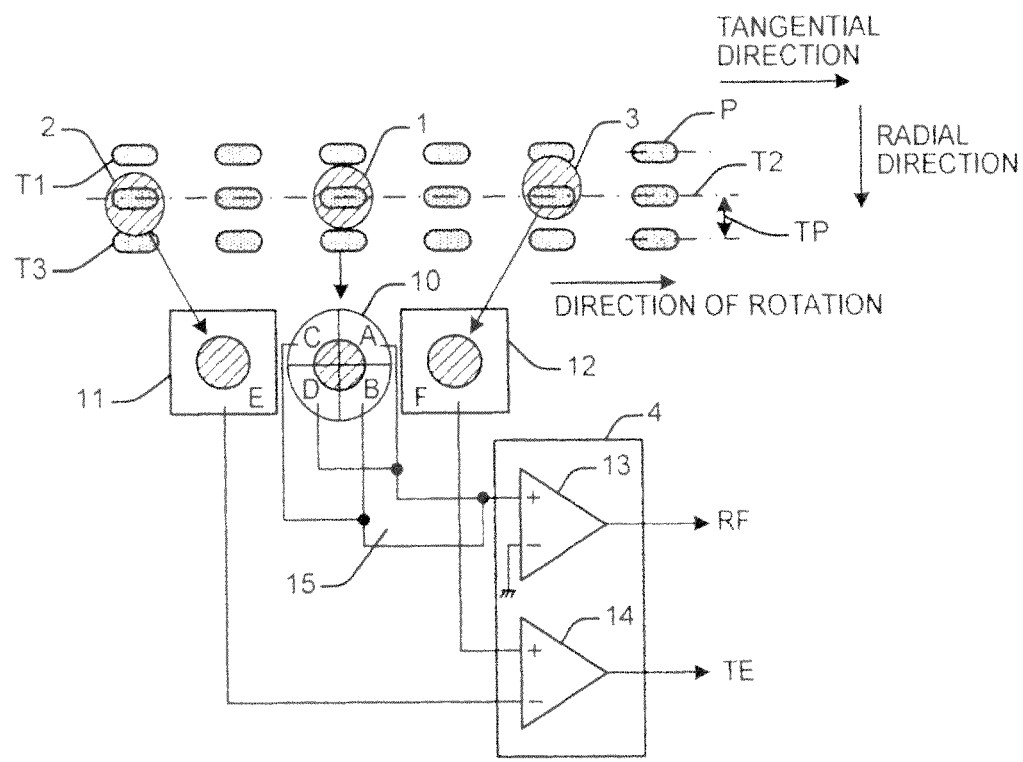
FIG. 1 a prior art detector unit with a main detector and two satellite detectors of a pickup for providing a RF data signal and a tracking error signal, FIGS. 2a, 2b application of a pickup according to the invention providing a low beam intensity and high beam intensity providing a super-resolution effect on a respective optical storage medium, FIGS. 3a-3c application of the pickup of FIGS. 2a, 2b on an optical storage medium having a first region with a track pitch larger than the optical resolution limit and a second region having a track pitch below the optical resolution limit, and FIG. 4 a main detector and two satellite detectors of a detection unit included in the pickup in accordance with FIGS. 2a, 2b, 3a-3c.

With regard to FIG. 1, the principle of a 3-beam tracking method is explained for an apparatus comprising a pickup with a laser, an objective lens and a detector unit, as known from prior art. The pickup provides a main beam 1 for reading a data signal from a track T2 of an optical disc and two satellite beams 2 and 3 for providing a tracking error signal for a tracking control of the pickup.

As shown FIG. 1a in a simplified manner, the optical disc comprises three essentially parallel tracks T1, T2, T3 with pits P, which provide a high frequency digital data signal, when read by the pickup. The tracks T1-T3 are each separated from one another by a track pitch TP. The beams 1, 2, 3 move in a tangential direction for reading the data signal of a respective track, here track T2, in accordance with the rotating speed of the optical disc. The tracking control is performed in radial direction, for keeping the main beam 1 in the center of the respective pits of the track T2.

The three beams 1-3 can be generated in the pickup for example by means of a diffraction grating or a grating lens, as well known by a person skilled in the art. The grating means divides the light beam, as emitted from the laser within the pickup, into three respective beams, the main beam 1 and the two satellite beams 2 and 3. The satellite beams 2, 3 are slightly separated from the main beam in the tangential direction, satellite beam 2 being ahead and satellite beam 3 being behind with regard to the position of the main beam 1.

In addition, the satellite beams 2, 3 are shifted in the radial direction with regard to the main beam 1, for example by ¼ track pitch TP, when the main beam 1 is positioned precisely on a respective track. The satellite beam 2 ahead of the main beam 1 is shifted for example by ¼ track pitch to the inner side of the optical disc and the satellite beam 3 is shifted by ¼ track pitch to the outer side of the optical disc with regard to the main beam 1.

For a detection of the reflected light of the three beams 1-3 from the optical disk, the pickup comprises a photodetector 10 within the detector unit, for detecting the light reflected from the main beam 1, and two photodetectors 11, 12 for detecting the reflected light of the satellite beams 2 and 3. The detectors 11, 12 are shifted, respectively positioned away from the detector 10 in correspondence with the satellite beams 2, 3 such that optical elements as included in the pickup concentrate the reflected light from the satellite beams 2 and 3 on the photodetectors 11 and 12.

The photodetector 10 is divided into four segments A-D, which output signals are combined in an adding circuit 15 for providing an electrical output signal. The sum signal of the adding circuit 15 is amplified by an amplifier 13 of a preamplifier 4 for providing a modulated high frequency data signal RF, also called radio frequency or RF signal.

The signals from the photo detectors 11, 12 are subtracted, also amplified, by a subtracting circuit 14 of the preamplifier 4 for providing a tracking error signal TE. The tracking error signal TE is zero, when the main beam 1 is on track of a respective track, and is positive or negative depending on the radial shift of the pickup with regard to the respective track, from which the data are read. A pickup of this kind is described for example in U.S. Pat. No. 6,510,112 B1.

Figures 2A, 2B:
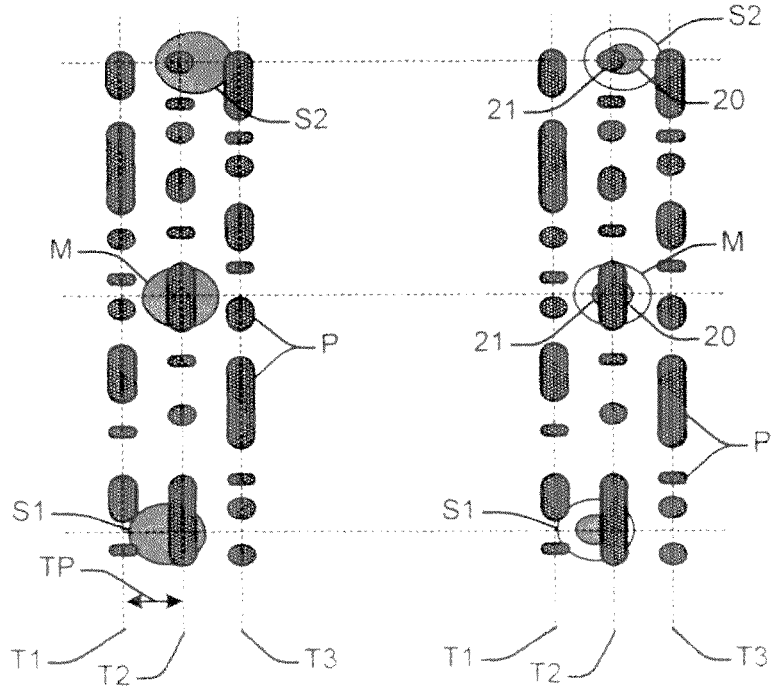

In FIGS. 2a, 2b in a simplified manner a small area of an optical storage medium comprising a mask layer for providing a super-resolution near field effect (Super-RENS) is shown, the storage medium having tracks with pits P, shown are tracks T1-T3, with a track pitch TP being lower than the resolution limit of an optical pickup, as included in a respective apparatus for reading data from or writing data to the Super-RENS storage medium. The track pitch TP is in particular lower than the resolution limit of a Blu-ray pickup comprising a blue laser diode.

The pickup for reading and/or writing data according to the invention operates by using a 3-beam method with a main beam M and two satellite beams S1, S2; one satellite beam, for example satellite beam S1, being ahead of the main beam M and the second satellite beam, for example satellite beam S2, being behind the main beam M. The track offset of the satellite beams S1, S2 is for example ¼ of the track pitch TP, as shown in FIGS. 2a, 2b. The satellite beams S1, S2 therefore partly overlap with the pits P of the middle track T2, on which track the main beam M is focused.

In FIGS. 2a, 2b, the invention is explained with regard to reading a data signal from a Super-RENS storage medium. When the pickup provides a high read power for the main beam M and also for the two satellite beams S1, S2, sufficiently high to provide a super-resolution effect for all three beams M, S1, S2, as shown in FIG. 2b, the sensitivity for the tracking regulation is considerably improved, as compared with FIG. 2a. As shown in FIG. 2b, the effective, inner area 20 in which the super-resolution effect takes place, is much smaller than the total area 21 of the satellite beams S1, S2. In case the track offset of the satellite beams S1, S2 with regard to the main beam M is ¼ of the track pitch, an essential part of the effective spot size 20 overlaps with the pits P of the track T2 and an essential part of the effective spot size 20 is sensitive to the region between the pits P of tracks T1, T2 or T2, T3, and therefore a very sensitive tracking signal can be obtained with the 3-beam method for such kind of a Super-RENS storage medium.

For a low read power, below the threshold power for providing the super-resolution effect of a respective Super-RENS storage medium, the spot sizes of the main beam M and the satellite beams S1, S2 are very large, as shown in FIG. 2a. In this case, the tracking regulation would be less sensitive, as compared with satellite beams S1, S2 using a high power in accordance with FIG. 2b.

As shown in FIGS. 3a-3c, the application of a pickup as described with regard to FIGS. 2a, 2b is applied to an optical storage medium having a first region with tracks having a track pitch above the optical resolution limit, and a second region, in which the tracks have a track pitch below the optical resolution limit. The storage medium is in particular an optical disk. The FIG. 3a is related to the first region of an optical storage medium in which the track pitch is above the optical resolution limit, for example 315 nm. The FIGS. 3b, 3c are related to the second region of the optical storage medium, in which the tracks have a track pitch below the optical resolution limit lambda/2*NA of the pickup, for example 210 nm.

In region 1, FIG. 3a, the pickup can operate with low read power for reading of the data, not utilizing the super-resolution effect. For reading data of tracks having a track pitch of 315 nm, in particular a pickup having a blue laser diode with a wavelength of example 405 nm can be used, as known for example from appliances for reading Blu-Ray and HD-DVD optical discs. The track offset of the satellite beams S1, S2 is adjusted such with regard to the main beam M, that the beam spots of the satellite beams S2, S1 fall in between the tracks, corresponding for example with a track offset of 0.5. Then a differential push-pull tracking method (DPP) is used advantageously for tracking while reading the data of the tracks, which allows a wide regulation range for tracks having a track pitch above the optical resolution limit, e.g. 315 nm as shown in FIG. 3a. Depending on the actual disc, the described pickup may use also alternatively the differential phase detection (DPD) method for tracking by using the four detector segments A-D. This is in particular required if the actual disc doesn't show a sufficient push-pull signal.

The track pitches for the region 1 and for the region 2 are chosen such that their ratio is in the range of 1.4 to 1.6, for example 315 nm for region 1 and 210 nm for region 2. The regions 1, 2 can then be read by an apparatus having a pickup utilizing a 3-beam method, as explained before with regard to FIGS. 2a, 2b. The pickup comprises in particular a blue laser diode and a respective optics for reading the data from the optical disc. The main beam M and the two satellite beams S1, S2 can be generated for example inside the pickup by using a grating.

For reading the data in the region 1, the differential push-pull method with three beams is used, and for reading the data of the region 2, a 3-beam tracking method is utilized. The satellite beams S1, S2 are therefore used in a different manner for region 1 and for region 2. The use of these two tracking methods provides in particular optimum results for both regions 1 and 2, when the ratio of the track pitches of region 1 and region 2 is about 1.5. This corresponds with a radial data density increase of 1.5 for the region 2 in comparison with region 1. As known, the Super-RENS effect allows already an increased data density in track direction of about 2 to 4 with regard to a Blu-Ray disk. Therefore, an increased data density of 3 to 6 can be reached for the region 2 with regard to the region 1, for which no Super-RENS effect is used.

In region 2, in which the smaller track pitch of 210 nm is used, FIGS. 3b, 3c, the satellite beams S1 and S2 are partly overlapping with the neighbouring tracks T1 respectively T3, when the main beam M is focused on the track T2. This corresponds with a track offset of ¾ track, when the ratio of the track pitches between region 1 and region 2 is about 1.5. For the region 2, for which the super-resolution effect is applied, as shown in FIG. 3c, for both the main beam M and the satellite beams S1, S2, then advantageously the 3-beam tracking method is used. The servo system for the tracking regulation of the pickup therefore has to switch between two tracking methods, for reading data from the region 1 and for reading data from the region 2 of the optical disc.

A detector unit, which can be used advantageously for the 3-beam tracking method as well as for the differential push-pull tracking method is described now with regard to FIG. 4. The detector unit comprises a main detector 40 with four segments A, B, C, D, for detecting the light from the main beam M, as reflected from the optical storage medium. For the satellite beam S1 a second detector 41 and for the satellite beam S2 a third detector 42 is used, which are each split in two halves with regard to the radial direction of the optical storage medium; detector 41 in two segments E1, E2 and detector 42 in two segments F1, F2. The geometrical arrangement of the detectors 40-42 inside the pickup is made in particular such that the main beam M is centered on detector 40, the satellite beam S1 is centered on detector 41 and the satellite beam S2 is centered on detector 42. The segments A-F2 are photosensitive elements as known for a person skilled in the art.

For calculating the tracking error signal TE1 for the 3-beam tracking method, as applied for region 2, FIG. 3c, the following formula is used:

$$TE1=(E1+E2)-(F1+F2)$$

Only the satellite beams S1 and S2 contribute to the tracking error signal TE1. The signals from the segments E1, E2, respectively F1, F2, of detectors 41, 42 are each added. Because the difference between the detector signals 41 and 42 is calculated, the tracking error signal TE1 is zero when the main beam M is exactly on track. When the main beam M goes out of track in one direction, the signal of a first of the detectors 41, 42 increases and the signal of the second of the detectors 41, 42 decreases correspondingly; and when the main beam goes out of track in the opposite direction, the signal of the second of the two detectors 41, 42 increases and the signal of the first of the detectors 41, 42 decreases. The 3-beam tracking method provides therefore a stabile tracking regulation for the region 2 of the optical disc with reference to tracking error signal TE1=zero, when the main beam M is on track.

For the differential push-pull tracking method, as applied for region 1, FIG. 3a, the following formula is used for providing a tracking error signal TE2:

$$TE2 = CPP - \beta * OPP$$
$$= ((A+B)-(C+D))-\beta((E2-E1)+(F2-F1))$$

For each of the detectors 40-42 a differential signal is calculated from the segments for each detector, so that each of the detectors 40-42 is very sensitive to a radial movement of the pickup. The signals of the detectors 40, 41, 42 are in particular zero when the main beam M is centered on a respective track. The tracking error signal TE2 is therefore also zero when the main beam M is on track. When the pickup moves in one direction, the signal CPP of the center detector 40 goes above or below zero, and the signal OPP of the satellite detectors 41, 42 goes correspondingly above or below zero. However, the polarity and amplitude of the signals of the center detector 40 and the satellite detectors 41, 42 are different.

For improving the balance between the signals CPP and OPP, a factor β is included in the formula which is chosen advantageously such, that the values CPP and OPP have about the same order of magnitude, so that both the center detector 40 and the satellite detectors 41, 42 give an essential contribution to the tracking error signal TE2 and further the disturbing offsets due to misalignments, e.g. actuator shifts, are cancelled out. In the factor β in particular the intensity distribution between the main beam M, as received on the detector 40, and the beams reflected on the satellite detectors 41, 42 is taken into account. The tracking error signal TE2 therefore goes to negative values, when the pickup is out of track in one direction, and to positive values, when the pickup is out of track in the other direction.

The pickup having a detector unit as described with regard to FIG. 3 provides therefore a stable tracking error signal for a tracking servo system, when reading data from an optical storage medium comprising two regions with different track pitch. By using the 3-beam tracking method, in particular data from a Super-RENS region can be read, having a track pitch being a factor of about 1.5 smaller than the track pitch of a Blu-ray disc, which track pitch is therefore below the diffraction limit of a pickup with a blue laser diode.

The region 1 of the optical storage medium may be used for providing some basic disc information about the data stored in region 1 and region 2. It may include in particular the information about the size of the region 2, for example for which tracks the super-resolution effect has to be applied for reading of the data.

Also other embodiments of the invention can be made by a person skilled in the art without departing from the spirit and scope of the invention. The invention is in particular not limited to a pickup comprising a Blu-Ray disc type pickup. The invention resides therefore in the claims herein after appended.

The invention claimed is:

1. An apparatus comprising a pickup with a laser, a detector unit and an objective lens for reading data from or writing data to a Super-RENS optical storage medium having a track pitch below the optical resolution limit, the pickup providing a main beam for reading and/or writing of data and two satellite beams for providing a tracking error signal, the three beams being focused by the objective lens onto the optical storage medium, and the reflected light from the optical storage medium being guided onto the detector unit, characterized in that for reading of data, the light intensity of the two satellite beams is each in the order of 50 to 100% of the intensity of the main beam for providing a light intensity on the optical storage medium being sufficient for applying a super-resolution effect for the main beam as well as for each satellite beam on the storage medium.

2. The apparatus of claim 1, wherein the light intensity of the two satellite beams is each in the order of 70 to 100% of the intensity of the main beam for reading of data, and wherein the light intensity of the two satellite beams is each smaller than 50% of the intensity of the main beam for recording of data.

3. The apparatus of claim 1, wherein the detector unit comprises a main detector for detecting reflected light from the main beam, and two satellite detectors for detecting reflected light from the satellite beams, as reflected from the optical storage medium, and wherein the detector unit provides a 3-beam tracking error signal for a tracking regulation.

4. The apparatus of claim 3, wherein the 3-beam tracking error signal TE1 is calculated by taking into account the relation TE1=(E1+E2)−(F1+F2).

5. The apparatus of claim 3, wherein the 3-beam tracking regulation is designed for application for a second region of the optical storage medium, in which region the tracks have a track pitch below the optical resolution limit lambda/2*NA, and for which region a super-resolution effect has to be applied for reading of data.

6. The apparatus according to claim 1, wherein the two satellite detectors are each divided into two parts for providing a differential push-pull tracking error signal for a first region of the optical storage medium, for which no super-resolution effect has to be applied.

7. The apparatus of claim 6, wherein a 3-beam tracking error signal TE2 is calculated by taking into account the relation TE2=((A+B)−(C+D))−β*((E2−E1)+(F2−F1)).

8. The apparatus of claim 5, wherein the detector unit is designed such, that the two satellite beams have a track offset of approximately ½ track pitch with regard to the main beam for use of a differential push pull tracking regulation within the first region, and have a track offset of approximately ¾ of the track pitch of the second region for use of the three beam tracking regulation within the second region.

9. An optical storage medium comprising a first region with tracks having a track pitch above the optical resolution limit, and having a second region with tracks having a track pitch below the optical resolution limit, for use with an apparatus in accordance with claim 3.

10. The optical storage medium of claim 9, wherein the track pitch of the first region is in a range of 300-330 nm and in the second region of 150-240 nm requiring a super-resolution effect for reading or writing of data.

11. The optical storage medium of claim 10, wherein the ratio of both track pitches is in a range of 1.4 to 1.6.

12. A system, comprising an apparatus according to claim 1 and an optical storage medium.

* * * * *